Oct. 10, 1944.   W. GRIFFITHS   2,360,125
FERTILIZER SPREADER
Filed July 23, 1942   2 Sheets-Sheet 1

Inventor:
William Griffiths,
By Paul O. Pippel
Atty.

Oct. 10, 1944.  W. GRIFFITHS  2,360,125
FERTILIZER SPREADER
Filed July 23, 1942  2 Sheets-Sheet 2
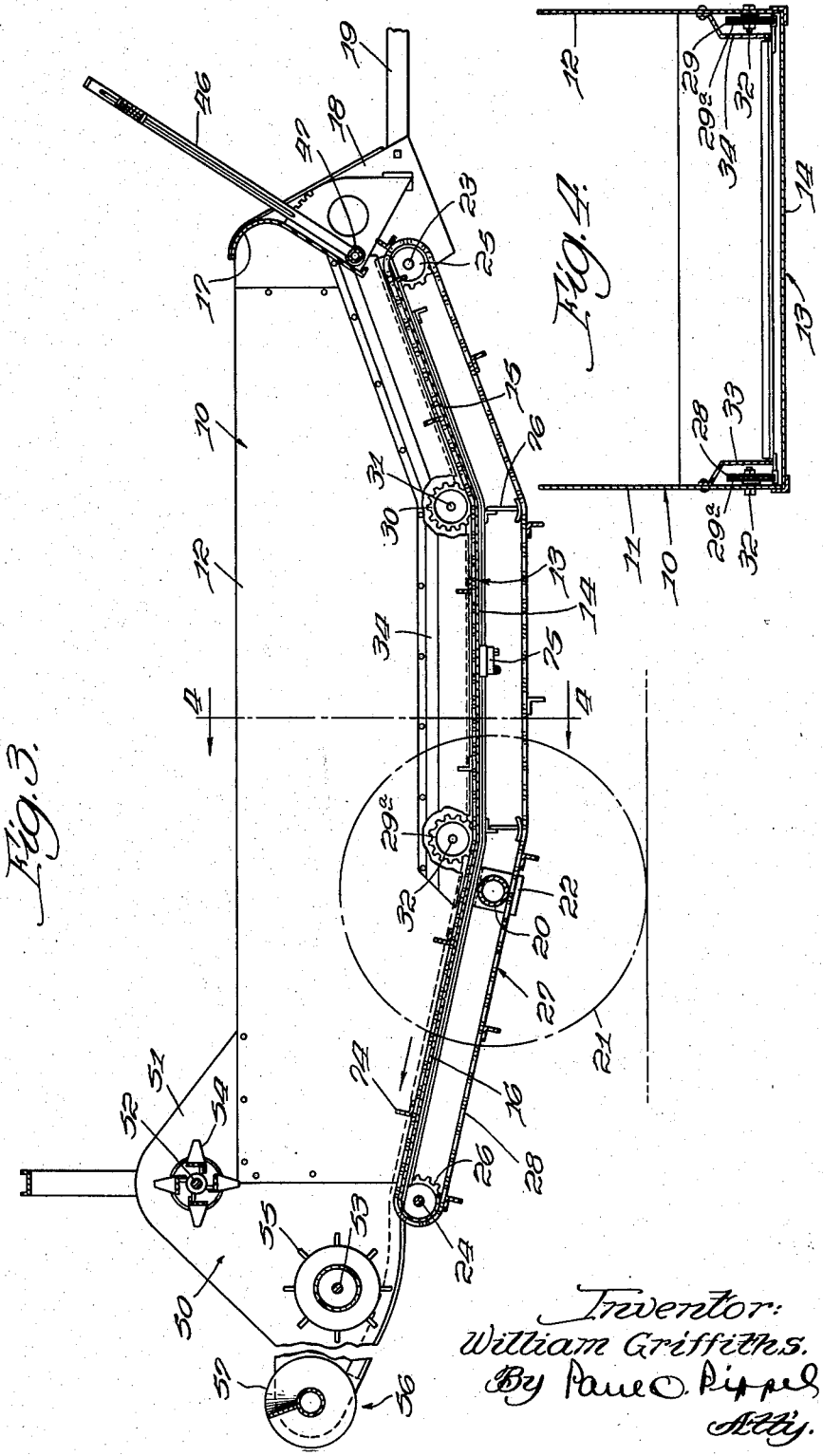
Inventor:
William Griffiths.

Patented Oct. 10, 1944

2,360,125

UNITED STATES PATENT OFFICE 2,360,125

FERTILIZER SPREADER

William Griffiths, Black Creek, Wis.

Application July 23, 1942, Serial No. 452,043

10 Claims. (Cl. 275—5)

This invention relates to a fertilizer spreader and, more particularly, to a spreader for a natural fertilizer such as manure.

Typical spreader constructions heretofore known are adapted for the handling of manure in only solid form. Previously, agriculturists and manufacturers had not appreciated the advantages possible from the use of liquid fertilizer, or, appreciating this, they failed to provide suitable means for handling the same, with the result that large quantities of liquid fertilizer were constantly wasted.

The principal object of the present invention is to provide a machine adapted to handle and spread liquid fertilizer.

An important object is to provide such a machine for the spreading of fertilizer in both solid and liquid form.

Another important object is to provide a spreader having a body including a liquid-tight portion adapted to contain the liquid fertilizer without loss thereof.

Another object is to provide means for the discharging and spreading of the liquid fertilizer, and preferably to provide means for discharging the fertilizer in both forms simultaneously.

Another object is to provide means shielding the discharge or feeding mechanism from the contents of the spreader body, thus preventing clogging of that mechanism.

Other important objects and desirable features of the invention will become apparent to those skilled in the art as the disclosure is more fully made in the following detailed description and accompanying sheets of drawings, in which:

Figure 3 is a view on a different scale, showing the same structure illustrated in Figure 1, but with the inner wheel and side sheet of the body removed; and Figure 4 is a transverse sectional view taken on the line 4—4 of Figure 3.

Figure 1:
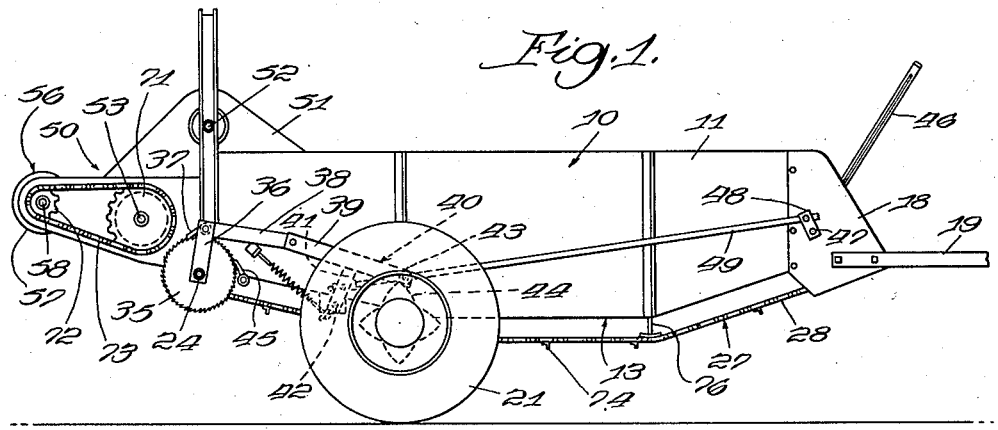
Figure 1 is a side elevational view of a preferred form of spreader construction embodying the invention.

In order that the principles of the invention may be suitably utilized, it has been found expedient to embody the invention in a spreader construction that closely approximates that of commercial spreaders now on the market. Accordingly, the following description will pertain to such preferred embodiment of the invention, it being understood, of course, that the disclosure is illustrative and not limiting.

The spreader includes a main body, generally indicated at 10, including a pair of transversely spaced, vertical side sheets 11 and 12, and a bottom 13. As best shown in Figure 3, the bottom includes a depending, intermediate floor section 14 and a pair of oppositely, upwardly sloping floor sections 15 and 16. As will be hereinafter more fully described, the bottom 13 is liquid tight and has liquid-tight connection with the side sheets 11 and 12.

The front floor section 15 slopes upwardly toward the front end of the spreader body 10 and is associated with a front wall portion 17 extending transversely across the bottom. The wall 17 is formed as part of a front end structure that includes a pair of plate members 18, spaced transversely apart and respectively associated with the side sheets 11 and 12. The front end structure further includes a forwardly extending draft or hitch means 19, which may be suitably connected to a tractor or other source of draft power.

The rear end of the spreader body 10 is suitably carried on a transverse axle 20 and a pair of wheels 21. The axle 20 is appropriately secured by brackets 22 to the under portion of the body 10.

As will be seen from the description thus far, the body 10 differs from the usual spreader body in that it has a depending, intermediate, liquid-tight portion, the side sheets 11 and 12, and the floor 13 combining to provide a liquid-tight, hopper-like body having an intermediate portion disposed at a level below the opposite end portions. This construction enables the body 10 to contain a supply of both solid and liquid fertilizer. This fertilizer is preferably discharged at the rear of the body 10 in a manner which will presently be described.

The transversely spaced side plates 18 at the front of the body journal therebetween a transverse shaft 23. The rear end of the body carries a parallel shaft 24. These shafts respectively carry transversely spaced drive elements in the form of sprockets 25 and 26. These sprockets carry a discharge means in the form of an endless feeder apron or conveyor generally indicated at 27. This conveyer preferably comprises a pair of transversely spaced endless, flexible elements in the form of chains 28 and 29 trained about the sprockets 25 and 26 on the shafts 23 and 24. An important feature of the invention lies in the constructional detail consisting of the conforming of the endless apron 27 to the shape of the bottom 13 of the body 10. As is best shown in Figures 3 and 4, the upper run of the apron 27 follows the contour of the floor sections 14, 15, and 16. For the purpose of accomplishing this result, there has been provided a first pair of transversely spaced sprockets 29a and 30. The sprockets 29a are located substantially at the junction of the floor sections 14 and 16, and the sprockets 30 are similarly located at the junction of the floor sections 14 and 15. The sprockets 30 are respectively journaled on stub shafts or pilots 31, and the sprockets 29a are similarly journaled on stub shafts or pilots 32. The direction of travel of the apron 27 is indicated by the arrow in Figure 3. The mechanism for driving the apron will be described below.

Because of the nature of the contents of the spreader body 10, it is desirable to provide means for shielding certain portions of the apron. To this end, the side sheets 11 and 12 respectively carry shield means 33 and 34. Each shield is preferably formed of an inverted sheet-metal trough rigidly secured along its upper edge to the respective side sheet and extending downwardly and enclosing the sprockets 29 and 30 and also overlying portions of the chains 28 and 29, respectively. This construction prevents clogging of the apron mechanism by the contents of the spreader body.

As best shown in Figure 1, the rear apron shaft 24 extends laterally outwardly at the right side of the spreader body and carries rigidly thereon a ratchet 35. An arm 36 is pivoted on the outer end of the shaft 24 and carries a driving pawl 37. A link 38 connects the upper end of the arm 36 with one end or arm 39 of a bell-crank 40. Another arm 41 of the bell-crank is pivoted at 42 on the outside of the spreader body. The arm 39 is provided with an extension 43, which carries a roller adapted to be engaged by the lobes of a cam 44 driven by the right-hand drive wheel 21. It will be seen that forward travel of the spreader results in rotation of the cam and oscillation of the bell-crank 40 to cause the pawl 37 to drive the ratchet 35 intermittently in a counter-clockwise direction. This intermittent, or step-by-step, rotation of the ratchet 35 and shaft 24 results in corresponding intermittent movement of the upper run of the apron 27 toward the rear or discharge end of the spreader body 10. A holding pawl 45 is associated with the ratchet 35 to prevent reverse rotation of that shaft.

The rate of operation of the pawl and ratchet mechanism just described may be controlled by means of a hand lever 46 located at the forward end of the spreader body in a position convenient to an operator on the tractor or other draft vehicle that draws the spreader. This lever is associated with a transverse rock-shaft 47 which has, at its outer end at the right side of the body, an arm 48 connected by a link 49 to the bell-crank 40 of the pawl and ratchet mechanism. Rocking of the lever 46 in either direction will regulate the relationship between the roller on the bell-crank 40 and the lobes of the cam 44 on the right rear wheel 21. The construction just described is generally conventional and may, of course, be suitably replaced by any other desirable mechanism.

As previously stated it is preferable to provide for the simultaneous discharge of both the liquid and solid manure from the body 10. For this purpose the rear of the body is provided with distributing or spreading mechanism, generally indicated by the numeral 50. Each of the side sheets 11 and 12 has rigidly secured thereto an extension plate 51, which extends upwardly to carry a transverse shaft 52 and rearwardly to carry a transverse shaft 53. The shaft 52 is journaled in the extension plates 51 and provides means for carrying an upper rotatable beater 54. This beater may be of any conventional construction and need not be illustrated or described in detail. The shaft 53 carries thereon a lower beater 55 which may likewise be of conventional construction. Each of the extension plates 51 may have secured thereto supporting means carrying a wide spread attachment generally indicated at 56. This attachment may be of any suitable form and is herein illustrated as a transverse spiral distributer or worm 57 suitably carried on a transverse shaft 58.

Figure 2:
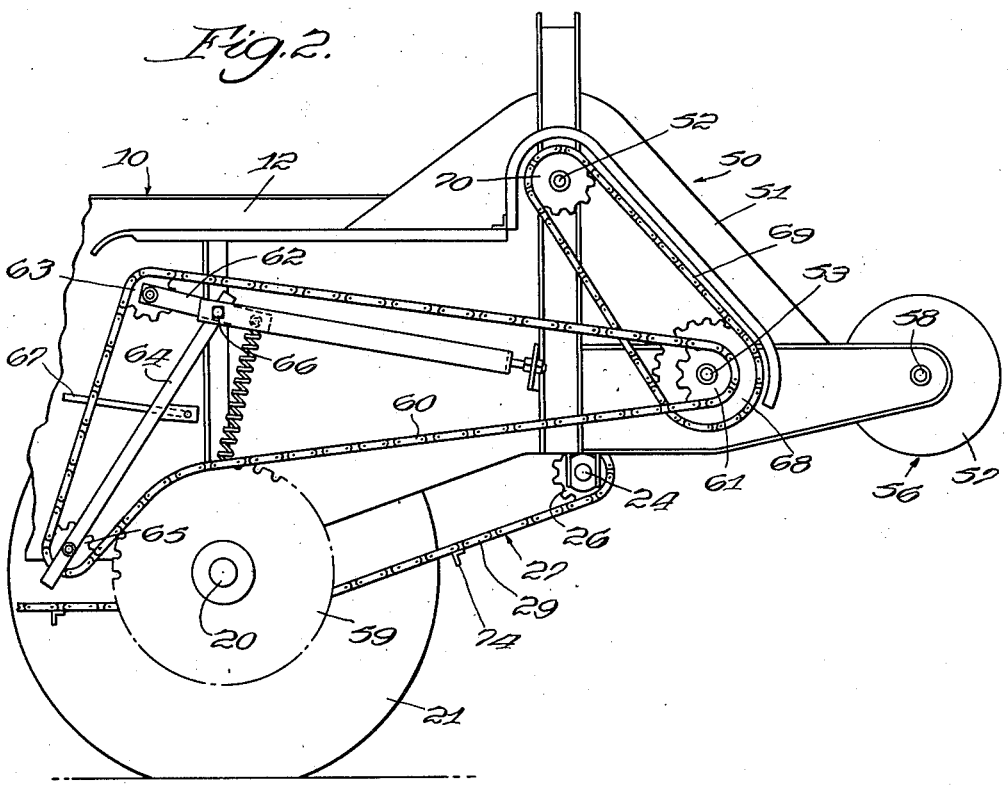
Figure 2 is an enlarged view, showing the rear portion of the other side of the spreader and illustrating portions of the drive mechanism for the discharge and distributing means.

The distributing mechanism 50 and the wide spread attachment 56 are suitably driven from the left rear wheel of the spreader, as best shown in Figure 2. The axle 20 at the left side of the spreader has keyed thereto a large driving sprocket 59, which is adapted to be engaged by a drive chain 60. The lower beater shaft 53 extends laterally outwardly at the left side of the body 10 and carries a sprocket 61 about which the drive chain 60 is trained. An arm 62 carries a sprocket 63, and a second arm 64 carries a similar sprocket 65. The arms 62 and 64 are pivoted at 66 on the left side sheet 12 of the spreader body, and are arranged to be rocked by means of a link 67 extending forwardly alongside the left side of the body. This link may be suitably controlled by a lever (not shown) at the forward end of the body. The chain 60 is, of course, trained about the sprockets 63 and 65, and, by means of the arrangement of the arms 62 and 64, may be raised or lowered out of or into engagement with the large drive sprocket 59. This construction is likewise generally conventional and may be replaced by any suitable drive mechanism.

The lower beater shaft 53 carries a second and larger sprocket 68. A drive chain 69 is trained about this sprocket and about a sprocket 70 on the upper beater shaft 52.

The lower beater shaft 53 carries a sprocket 71 at the right side of the spreader body, and this sprocket and a sprocket 72 on the worm shaft 58 have trained thereabout a drive chain 73. From the foregoing description it will be seen that a complete drive for all parts of the spreader is established by means of the rear drive wheels 21 and associated driving mechanism.

The construction of the apron 27 may be very similar to aprons or conveyers heretofore known, and accordingly the chains 28 and 29 of the apron illustrated here are cross-connected by a plurality of transverse load-engaging elements or slats 74. During rearward travel of the apron, these slats engage the combined liquid and solid fertilizer and move the same rearwardly toward the distributer means 50 and the wide spread attachment 56, very much in the usual manner.

The intermediate floor section 14 of the depending liquid-tight bottom 13 is provided with a suitable drain 75, by means of which remaining liquid fertilizer may be drained from the body 10. The bottom 13 is provided with guide means 76 engageable with the lower run of the conveyer 27 for the purpose of guiding the conveyer in its path around the bottom of the body.

The operation of the spreader is very similar to that of conventional spreaders and may be readily understood from the foregoing description of the spreader construction. According to the preferred form of the invention illustrated, both liquid and solid manure is loaded into the body 10. Since the intermediate portion of the bottom 13 is lower than the end portions, and particularly the discharge end portion, of the body, it will be seen that none of the liquid manure will leak out during transporting of the spreader to the field, and that the discharge of the liquid manure is confined to the discharge of the solid manure at the rear end of the machine. Conforming of the apron 27 to the shape of the bottom of the spreader provides for desirable and efficient feeding and discharge of both forms of manure simultaneously.

Other features of the invention will undoubtedly disclose themselves to those skilled in the art. It will be understood, of course, that the foregoing description pertains to only a preferred embodiment of the invention and that numerous modifications and alterations may be made therein without departing from the spirit and scope of the invention as defined in the appended claims.

What is claimed is:

1. A fertilizer spreader, comprising a body adapted to contain both liquid and solid fertilizer, said body including side walls, and a bottom formed of downwardly sloping, liquid-tight floor sections; and means for discharging both solid and liquid fertilizer, including an endless conveyer passing through the body in a path conforming to the sloping floor sections of the bottom of the body.

2. A fertilizer spreader, comprising a body adapted to contain both liquid and solid fertilizer, said body including side walls, and a bottom formed as a liquid-tight hopper including a horizontal floor section and a pair of contiguous sloping floor sections; said body including a discharge opening; and means comprising an endless conveyer passing over and conforming to the aforesaid floor sections for discharging both liquid and solid fertilizer through the discharge opening.

3. A manure spreader, comprising a longitudinal body including discharge means and a liquid-tight bottom sloping downwardly away from said means; means for feeding manure toward said discharge means including a longitudinally running endless conveyer comprising a pair of transversely spaced chains and crossbars connecting said chains; drive means for the conveyer; means engaging said chains to conform the conveyer to the sloping bottom; and shield means substantially enclosing said last-named means and portions of the chains.

4. A fertilizer spreader, comprising a longitudinal body including discharge means and a liquid-tight bottom sloping downwardly away from said means; means for feeding fertilizer toward said discharge means including a longitudinally running endless conveyer comprising a pair of transversely spaced flexible elements and cross elements connecting said flexible elements; drive means for the conveyer; means engaging said conveyer to conform the conveyer to the sloping bottom; and shield means substantially enclosing said last-named means.

5. A fertilizer spreader, comprising a body adapted to contain both liquid and solid fertilizer, said body including side walls, and a bottom formed of downwardly sloping, liquid-tight floor sections; means for discharging both solid and liquid fertilizer, including an endless conveyer passing through the body in a path conforming to the sloping floor sections of the bottom of the body; and shield means covering a portion of said conveyer.

6. A manure spreader comprising a liquid-tight body adapted to receive manure containing liquids and solids, a depending bottom in said body positioned centrally of its length, a pair of contiguous sloping portions adjoining said centrally depending bottom, whereby the liquid manure drains to the depending bottom, a discharge means at one end of said body, and means for conveying solid manure through the liquid manure in the depending bottom and thence to the discharge means.

7. A manure spreader comprising a liquid-tight body adapted to receive manure containing liquids and solids, a depending bottom in said body positioned centrally of its length, a pair of contiguous sloping portions adjoining said centrally depending bottom, whereby the liquid manure drains to the depending bottom, a discharge means at one end of said body, and means for conveying solid manure through the liquid manure in the depending bottom and thence to the discharge means, said means for conveying comprising an endless conveyer placed around the bottom of said body.

8. A manure spreader comprising a liquid-tight body adapted to receive manure containing liquids and solids, a depending bottom in said body positioned centrally of its length, a pair of contiguous sloping portions adjoining said centrally depending bottom, whereby the liquid manure drains to the depending bottom, a discharge means at one end of said body, means for conveying solid manure through the liquid manure in the depending bottom and thence to the discharge means, said means for conveying comprising an endless conveyer placed around the bottom of said body, and means for conforming the endless conveyer to the shape of the bottom including the depended portion and its contiguous sloping portions.

9. A manure spreader comprising a liquid-tight body adapted to receive manure containing liquids and solids and having an opening at one end thereof, a sump in said body, whereby the liquid manure drains to the sump, a discharge means in said body adjacent said opening, means for conveying solid manure through the liquid manure in the sump and thence to the discharge means, said discharge means comprising a beater member, a wide spreading worm, and means for rotatably driving said beater and worm.

10. A manure spreader comprising a longitudinally extending liquid-tight body adapted to receive manure containing liquids and solids and having an opening at the rear end thereof, a sump in said body, whereby the liquid manure drains to the sump, a discharge means in said body adjacent said opening, means for conveying solid manure through the liquid manure in the sump and thence to the discharge means, said discharge means comprising a beater member, a wide spreading member, and means for rotatably driving said beater and spreading member.

WILLIAM GRIFFITHS.